US010374678B2

(12) United States Patent
Lee et al.

(10) Patent No.: US 10,374,678 B2
(45) Date of Patent: Aug. 6, 2019

(54) CHANNEL STATE INFORMATION FEEDBACK METHOD AND APPARATUS

(71) Applicant: Samsung Electronics Co., Ltd., Suwon-si, Gyeonggi-do (KR)

(72) Inventors: Keon-Kook Lee, Suwon-si (KR); Young-Han Nam, Plano, TX (US); Tae-Young Kim, Seoul (KR); Jee-Hwan Noh, Suwon-si (KR); Hyun-Il Yoo, Suwon-si (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/752,106

(22) PCT Filed: Aug. 12, 2016

(86) PCT No.: PCT/KR2016/008933
§ 371 (c)(1),
(2) Date: Feb. 12, 2018

(87) PCT Pub. No.: WO2017/026860
PCT Pub. Date: Feb. 16, 2017

(65) Prior Publication Data
US 2018/0241454 A1 Aug. 23, 2018

Related U.S. Application Data

(60) Provisional application No. 62/204,582, filed on Aug. 13, 2015, provisional application No. 62/219,364, (Continued)

(51) Int. Cl.
*H04L 1/02* (2006.01)
*H04B 7/06* (2006.01)
(Continued)

(52) U.S. Cl.
CPC ......... *H04B 7/0626* (2013.01); *H04B 7/0417* (2013.01); *H04B 7/06* (2013.01);
(Continued)

(58) Field of Classification Search
CPC ...... H04B 7/0626; H04B 7/0417; H04B 7/06; H04B 7/0617; H04B 7/063; H04B 7/0632; H04B 7/0413; H04L 5/0048
(Continued)

(56) References Cited

U.S. PATENT DOCUMENTS

2013/0242773 A1  9/2013  Wernersson et al.
2013/0308715 A1  11/2013 Nam et al.
(Continued)

OTHER PUBLICATIONS

ZTE, "Enhanced CSI Schemes for TDD EBF/FD-MIMO System", 3GPP TSG RAN WG1 Meeting #81, R1-152984, May 16, 2015, Fukuoka, Japan.
Samsung, "Discussion on CQI for Rel.13 TDD FD-MIMO", 3GPP TSG RAN WG1 Meeting #81, R1-153390, May 18, 2015, Fukuoka, Japan.
European Office Action dated May 10, 2019, issued in a counterpart European application No. 16835500.6-1220.

*Primary Examiner* — Zewdu A Kassa
(74) *Attorney, Agent, or Firm* — Jefferson IP Law, LLP

(57) ABSTRACT

The present disclosure relates to a 5G or pre-5G communication system for supporting a higher data transfer rate beyond a 4G communication system such as LTE. A method and an apparatus for transmitting and receiving channel state information are disclosed. The method comprises: a step of transmitting, to a terminal, a signaling message including first information indicating at least one precoding matrix which is applicable to a symbol vector to be transmitted; a step of transmitting, to the terminal, a channel status information-reference signal (CSI-RS) for the terminal; and a step of receiving channel state information including a channel quality indicator (CQI) which is calculated using the selected precoding matrix on the basis of second information from the terminal.

13 Claims, 11 Drawing Sheets

Related U.S. Application Data filed on Sep. 16, 2015, provisional application No. 62/256,323, filed on Nov. 17, 2015.

(51) Int. Cl.
  *H04B 7/0417* (2017.01)
  *H04L 5/00* (2006.01)
  *H04B 7/0413* (2017.01)

(52) U.S. Cl.
  CPC ........... *H04B 7/063* (2013.01); *H04B 7/0617* (2013.01); *H04B 7/0632* (2013.01); *H04L 5/0048* (2013.01); *H04B 7/0413* (2013.01)

(58) Field of Classification Search
  USPC ................ 375/267, 260, 259, 316, 295, 219
  See application file for complete search history.

(56) References Cited

U.S. PATENT DOCUMENTS

| | | | |
|---|---|---|---|
| 2013/0343299 A1* | 12/2013 | Sayana | H04B 7/0417 370/329 |
| 2013/0343300 A1 | 12/2013 | Kim et al. | |
| 2014/0219326 A1 | 8/2014 | Ko et al. | |
| 2014/0241190 A1 | 8/2014 | Park et al. | |
| 2017/0201308 A1* | 7/2017 | Park | H04B 17/24 |
| 2018/0034615 A1* | 2/2018 | Liu | H04W 24/10 |

* cited by examiner

Rank 1 : (P15)
Rank 2 : (P15, P16) + power normalization
Rank 3 : (P15, P16, p17) + power normalization
Rank 4 : (P15, P16, p17, p18) + power normalization

CHANNEL STATE INFORMATION FEEDBACK METHOD AND APPARATUS

CROSS-REFERENCE TO RELATED APPLICATION(S)

This application is a U.S. National Stage application under 35 U.S.C. § 371 of an International application filed on Aug. 12, 2016 and assigned application number PCT/KR2016/008933, which claimed the benefit of U.S. Provisional Applications filed on Aug. 13, 2015 and assigned Ser. No. 62/204,582, filed on Sep. 16, 2015 and assigned Ser. No. 62/219,364, filed on Nov. 17, 2015 and assigned Ser. No. 62/256,323, the entire disclosure of which is hereby incorporated by reference.

TECHNICAL FIELD

The present disclosure relates to a method and an apparatus for effectively feeding back channel information in a wireless communication system.

BACKGROUND ART

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or a post-LTE system.

To achieve a high data transmission rate, implementing a 5G communication system in an extremely high frequency (mmWave) band (for example, a 60 GHz band) is being considered. To relieve the path loss of radio signals and to increase the transmission distance of radio signals in an extremely high frequency band, beamforming, massive Multiple-Input and Multiple-Output (massive MIMO), Full Dimensional MIMO (FD-MIMO), array antenna, analog beamforming, and large scale antenna techniques are under discussion for a 5G communication system.

Further, to improve the network of the system, technical development in an evolved small cell, an advanced small cell, a cloud Radio Access Network (cloud RAN), an ultra-dense network, Device to Device (D2D) communication, wireless backhaul, a moving network, cooperative communication, Coordinated Multi-Points (CoMP), and interference cancellation is progressing for the 5G communication system.

In addition, an Advanced Coding Modulation (ACM) scheme including Hybrid FSK and QAM modulation (FQAM) and Sliding Window Superposition Coding (SWSC) as well as an advanced access technique including Filter Bank Multi Carrier (FBMC), Non-Orthogonal Multiple Access (NOMA), and Sparse Code Multiple Access (SCMA) are being developed for the 5G system.

In the downlink of an LTE-based system, a reference signal common to all cells, that is, a Common Reference Signal (CRS), is defined. A CRS may be used not only for the demodulation of data channel signals but also for the measurement of downlink channel quality for scheduling, that is, a Channel Quality Indicator (CQI), for cell search and the estimation of a downlink channel state (measurement of mobility) in handover.

An LTE Advanced (LTE-A) system further defines, in addition to a CRS, a Channel State Information Reference Signal (CSI-RS) that is dedicated to CQI measurement. A CSI-RS may support CQI measurement for a plurality of cells and may be used to achieve the transmission of data channel signals by a plurality of cells. A CRS is used for the CQI measurement of a serving cell, while a CSI-RS may be used for the CQI measurement of neighboring cells.

A terminal determines a channel state for calculating CQI to be reported on uplink based on a CSI-RS and feeds back CSI including the CQI to a network. The CSI may include at least one of the following pieces of information in order to provide information on the channel state to the network.

Channel Quality Indicator (CQI)
Precoding Matrix Indicator (PMI)
Precoding Type Indicator (PTI)
Rank Indicator (RI)

For a User Equipment (UE), CSI is mainly for estimating channel quality and for recommending to a network an appropriate precoding matrix (that is, precoder) to be used for actual transmission. In LTE, sets of various precoding matrices, that is, codebooks, which can be used in different transmission environments, are defined to report a precoding matrix. Unlike in codebook-based precoding, codebooks in non-codebook-based CSI reporting are used only for CSI computation at a UE and are not used for actual transmission.

DETAILED DESCRIPTION OF THE INVENTION

Technical Problem

The present disclosure provides a method and an apparatus for reporting CSI feedback in a wireless communication system.

The present disclosure provides a method and an apparatus for transmitting and receiving a beamforming-based CSI-RS.

The present disclosure provides a method and an apparatus for performing non-codebook-based CSI reporting.

Technical Solution

According to one embodiment of the present disclosure, a method for receiving channel state information includes: transmitting, to a User Equipment (UE), a signaling message including first information indicating at least one precoding matrix that is applicable to a symbol vector to be transmitted; transmitting, to the UE, a Channel Status Information-Reference Signal (CSI-RS) for the UE; and receiving channel state information including a Channel Quality Indicator (CQI), which is calculated using a precoding matrix selected based on second information from the UE.

According to one embodiment of the present disclosure, a method for transmitting channel state information includes: receiving, from an evolved node B (eNB), a signaling message including first information indicating at least one precoding matrix that is applicable to a symbol vector to be transmitted by the eNB; receiving, from the eNB, a CSI-RS for a UE; and transmitting, to the eNB, channel state information including a CQI that is calculated using a precoding matrix selected based on second information.

According to one embodiment of the present disclosure, an apparatus in an eNB that receives channel state information includes: a communication unit that transmits, to a UE, a signaling message including first information indicating at least one precoding matrix that is applicable to a symbol vector to be transmitted, transmits, to the UE, a CSI-RS for the UE, and receives channel state information including a CQI that is calculated using a precoding matrix selected based on second information from the UE; and a controller that determines beamforming information for data transmission using the channel state information.

According to one embodiment of the present disclosure, an apparatus in a UE that transmits channel state information includes: a communication unit that receives, from an eNB, a signaling message including first information indicating at least one precoding matrix that is applicable to a symbol vector to be transmitted by the eNB, receives, from the eNB, a CSI-RS for the UE, and transmits channel state information to the eNB; and a controller that generates channel state information including a CQI that is calculated using a precoding matrix selected based on second information.

BRIEF DESCRIPTION OF DRAWINGS

The above and other aspects, features and advantages of exemplary embodiments of the present disclosure will be more apparent from the following detailed description taken in conjunction with the accompanying drawings, in which.

It should be noted that like reference numerals are used to illustrate equivalent or like elements, features, and structures throughout the drawings.

MODE FOR CARRYING OUT THE INVENTION

Figure 1:
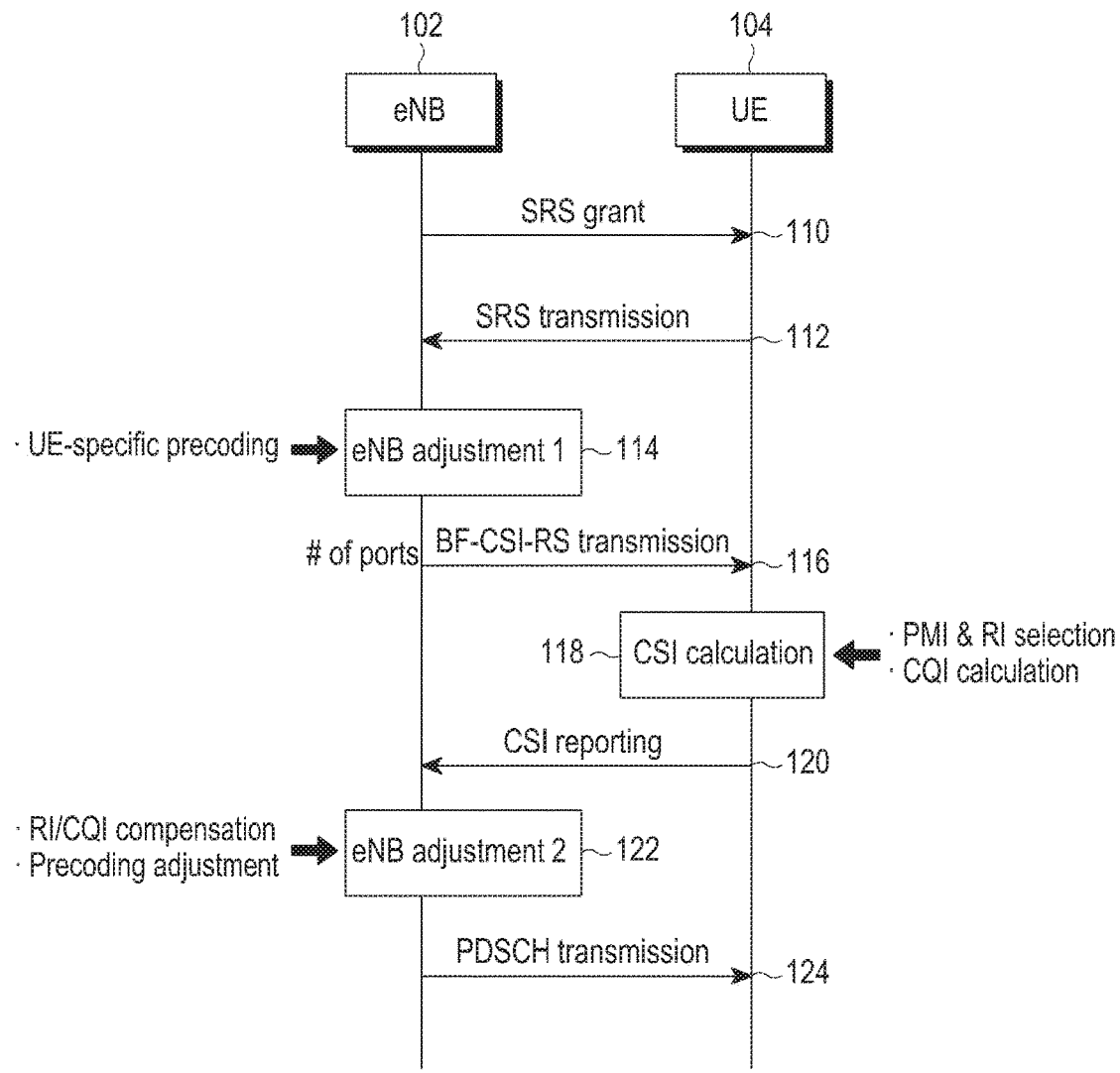
FIG. 1 is a view illustrating a scenario in which a beamformed reference signal is operated in a wireless communication system according to an embodiment of the present disclosure.

Hereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the term "~unit" as used in embodiments of the present disclosure means a software or hardware component, such as a field-programmable gate array (FPGA) or an application specific integrated circuit (ASIC), and the "~unit" performs any functions. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, subroutines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

In describing the embodiments of the present disclosure in detail, although a particular wireless communication system will be the primary target, it is to be understood that the subject matter to be claimed herein may be applied to other communication systems and services having similar technical backgrounds without departing from the scope of the disclosure herein, and this will be possible at the discretion of the person skilled in the art.

In a wireless communication system, a User Equipment (UE) may transmit an uplink Sounding Reference Signal (SRS) used for channel estimation to support uplink channel-dependent scheduling and link adaptation by a base station. The SRS may also be used to support downlink beamforming. In a Time Division Duplexing (TDD) system, a base station generally determines UE-specific beamforming suitable for data transmission based on channel estimation using an SRS received from a UE. In a Frequency Division Duplexing (FDD) system, a base station generally determines UE-specific beamforming based on channel state information transmitted from a UE.

In an FD-MIMO system, in order to improve the accuracy of beamforming, a base station generates first beamforming information using feedback information on an SRS transmitted from a UE or on a Channel State Information-Reference Signal (CSI-RS) transmitted for a long time and transmits an additional reference signal to which the first beamforming information is applied. Here, the CSI-RS refers to a reference signal transmitted for CSI calculation. Subsequently, the base station may generate more accurate second beamforming information using channel state information transmitted relating to the additional reference signal. The second beamforming information may be applied to data transmission.

FIG. 1 is a view illustrating a scenario in which a beamformed reference signal is operated in a wireless communication system according to an embodiment of the present disclosure. The illustrated scenario includes communication between a base station (evolved node B: eNB) 102 and a User Equipment (UE) 104.

Referring to FIG. 1, in operation 110, the eNB 102 transmits an SRS grant to the UE 104 to allocate resources necessary for SRS transmission. In operation 112, the UE 104 transmits an SRS to the eNB 102 using the allocated resources. In operation 114, the eNB 102 determines first beamforming information for performing UE-specific precoding based on channel estimation using the received SRS. Although not shown, when a CSI-RS transmitted for a long time is used instead of an SRS, operations 110 and 112 of FIG. 1 may be replaced with an operation in which the eNB 102 transmits a long-term CSI-RS to the UE 104 and receives channel state information from the UE 104.

In operation 116, the eNB 102 transmits a CSI-RS to which antenna port-specific beamforming is applied, that is, a beamformed CSI-RS (BF-CSI-RS), to the UE 104 according to the first beamforming information. The first beamforming information may include a precoding matrix suitably selected for the UE 104. The precoding matrix is UE-specific and is applied to the transmission of the UE-specific BF-CSI-RS. The BF-CSI-RS may be transmitted through one or more CSI-RS ports by precoding. Here, the port number p of CSI-RS antenna ports may be mapped such that p=15, p=15-16, p=15-18, and p=15-22.

In operation 118, the UE 104 calculates CSI based on the received BF-CSI-RS. Here, the UE selects a Precoding Matrix Index (PMI) and a Rank Index (RI) based on channel estimation using the BF-CSI-RI according to previously stored information or signaling information previously received from the eNB, and calculates a Channel Quality Indicator (CQI) based on the selected PMI and RI.

In operation 120, the UE 104 reports CSI including at least one of the PMI, the RI, and the CQI to the eNB 102. In operation 122, the eNB 102 may compensate for the RI and the CQI to be applied to downlink transmission and may perform precoding adjustment based on the CSI, thereby determining second beamforming information. In operation 124, the eNB 102 transmits a data signal to which transmission port-specific beamforming is applied according to the second beamforming information to the UE 104 through a Physical Downlink Shared Channel (PDSCH). The second beamforming information may include at least one of transmission parameters to be applied to the transmission of a data signal, such as a precoding matrix, a rank, a Modulation and Coding Scheme (MCS), a data transmission rate, and a transmission data size.

Figure 2:
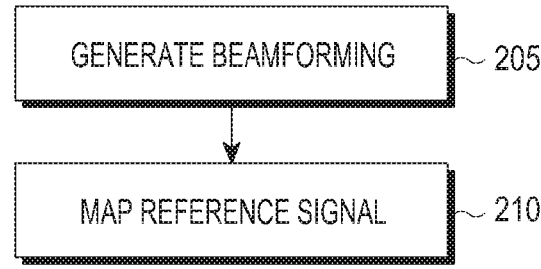
FIG. 2 illustrates a first beamforming adjustment 114 process of an eNB 102 in detail according to an embodiment of the present disclosure.

FIG. 2 illustrates a first beamforming adjustment 114 process of the eNB 102 in detail according to an embodiment of the present disclosure.

Referring to FIG. 2, in operation 205, the eNB 102 performs channel estimation using an SRS received from the UE 104 and determines first beamforming information, for example, a precoding matrix, based on the channel estimation. In operation 210, the eNB 102 generates a reference signal mapped to the first beamforming information, that is, a BF-CSI-RS.

Figure 3:
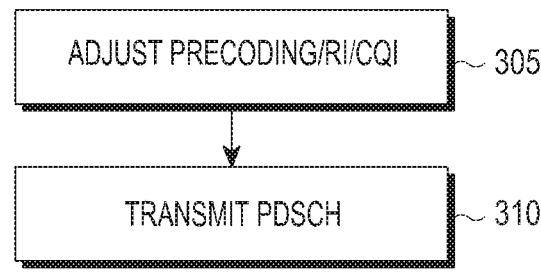
FIG. 3 illustrates a second beamforming adjustment 122 process of the eNB 102 in detail according to an embodiment of the present disclosure.

FIG. 3 illustrates a second beamforming adjustment 122 process of the eNB 102 in detail according to an embodiment of the present disclosure.

Referring to FIG. 3, in operation 305, the eNB 102 adjusts a PMI, an RI, and a CQI to be used for downlink data transmission based on CSI reported from the UE 104. In operation 310, the eNB 102 determines second beamforming information including transmission parameters for downlink transmission based on the adjusted PMI, RI, and CQI, generates a data signal on a PDSCH based on the transmission parameters, and transmits the data signal.

Figure 4:
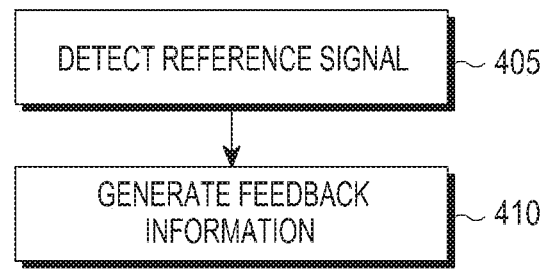
FIG. 4 illustrates a CSI calculation 118 process of a UE 104 in detail according to an embodiment of the present disclosure.

FIG. 4 illustrates a CSI calculation 118 process of the UE 104 in detail according to an embodiment of the present disclosure.

Referring to FIG. 4, in operation 405, the UE 104 detects a BF-CSI-RS received from the eNB 102 and performs channel estimation using the detected BF-CSI-RS. In operation 410, the UE 104 determines a PMI, an RI, and a CQI to be fed back based on the channel estimation, generates CSI including at least one of the PMI, the RI, and the CQI, and feeds back the CSI to the eNB 102. In one embodiment, the feedback information (that is, CSI) may be configured by the eNB 102.

Figure 5:
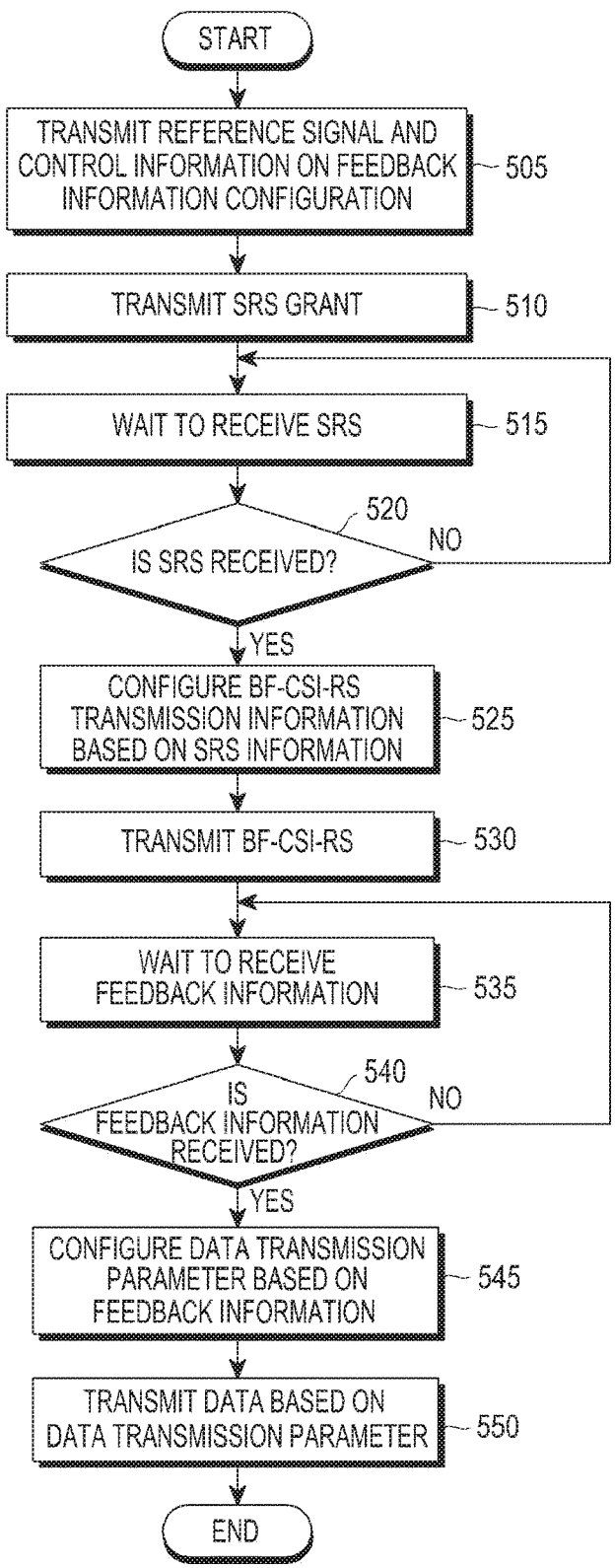
FIG. 5 is a flowchart illustrating the operation of an eNB that operates a beamformed reference signal according to an embodiment of the present disclosure.

FIG. 5 is a flowchart illustrating an operation of an eNB that operates a beamformed reference signal according to an embodiment of the present disclosure.

Referring to FIG. 5, in operation 505, the eNB transmits a reference signal and control information on the configuration of feedback information to a UE. For example, the control information may indicate the type of information to be included in the feedback information or a codebook index used for generating the feedback information. The eNB transmits an SRS grant (or SRS trigger) to the UE and allocates resources required for SRS transmission in operation 510, and waits to receive an SRS transmitted from the UE in operation 515.

In operation 520, the eNB checks whether the SRS is received. When no SRS is received, the eNB returns to operation 515 and continues waiting to receive the SRS. When the SRS is received in operation 520, the eNB determines first beamforming information based on the received SRS in operation 525. The first beamforming information defines UE-specific precoding based on information on the received SRS. In operation 530, the eNB transmits a BF-CSI-RS beamformed based on the first beamforming information.

The eNB waits to receive feedback information from the UE, for example, a CSI report, in operation 535, and checks whether the CSI report is received in operation 540. When no CSI report is received as a result of checking, the eNB continues waiting to receive the CSI report proceeds in operation 535. When a CSI report is received, the eNB determines second beamforming information based on the received CSI report in operation 545. The second beamforming information may be generated by performing RI and CQI compensation and precoding adjustment based on the CSI report.

In operation 550, the eNB transmits, to the UE, a data signal beamformed based on the second beamforming information.

Figure 6:
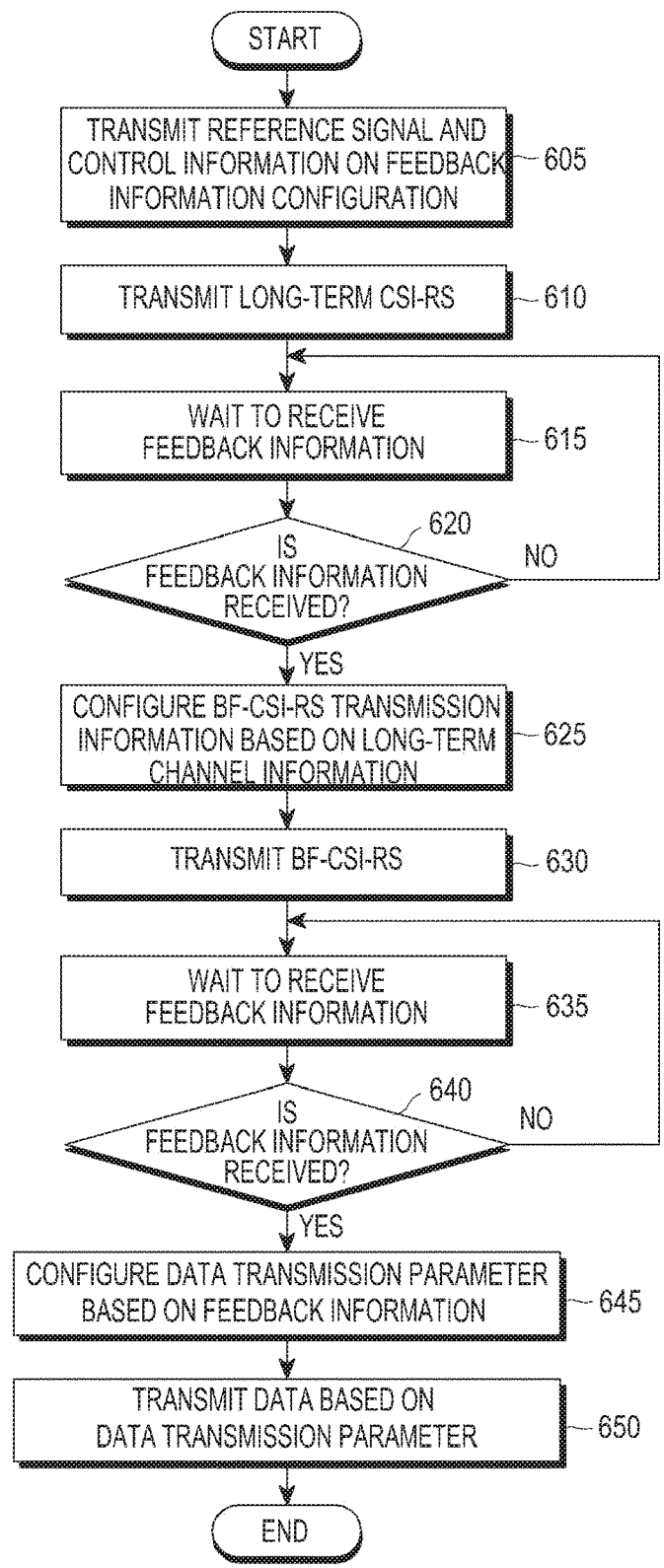
FIG. 6 is a flowchart illustrating the operation of an eNB that operates a reference signal based on a long-term CSI-RS according to an embodiment of the present disclosure.

FIG. 6 is a flowchart illustrating the operation of an eNB that operates a reference signal based on a long-term CSI-RS according to an embodiment of the present disclosure.

Referring to FIG. 6, in operation 605, the eNB transmits a reference signal and control information on the configuration of feedback information to a UE. For example, the control information may indicate the type of information to be included in the feedback information or a codebook used for selecting a PMI and an RI to be included in the feedback information. The eNB transmits a long-term CSI-RS to the UE in operation 610, and waits to receive feedback information transmitted from the UE in operation 615.

In operation 620, the eNB checks whether the feedback information is received. When no feedback information is received as a result of checking, the eNB returns to operation 615 and continues waiting to receive the feedback information. When the feedback information is received, the eNB determines first beamforming information based on the received feedback information in operation 625. In operation 630, the eNB transmits a BF-CSI-RS beamformed based on the first beamforming information.

The eNB waits to receive feedback information from the UE, for example, a CSI report based on the transmitted BF-CSI-RS, in operation 635, and checks whether the CSI report is received in operation 640. When no CSI report is received as a result of checking, the eNB continues to wait to receive the CSI report in operation 635. When the CSI report is received, the eNB determines second beamforming information based on the received CSI report in operation 645. The second beamforming information may be generated by performing RI and CQI compensation and precoding adjustment based on the CSI report.

In operation 650, the eNB transmits, to the UE, a data signal beamformed based on the second beamforming information.

Figure 7:
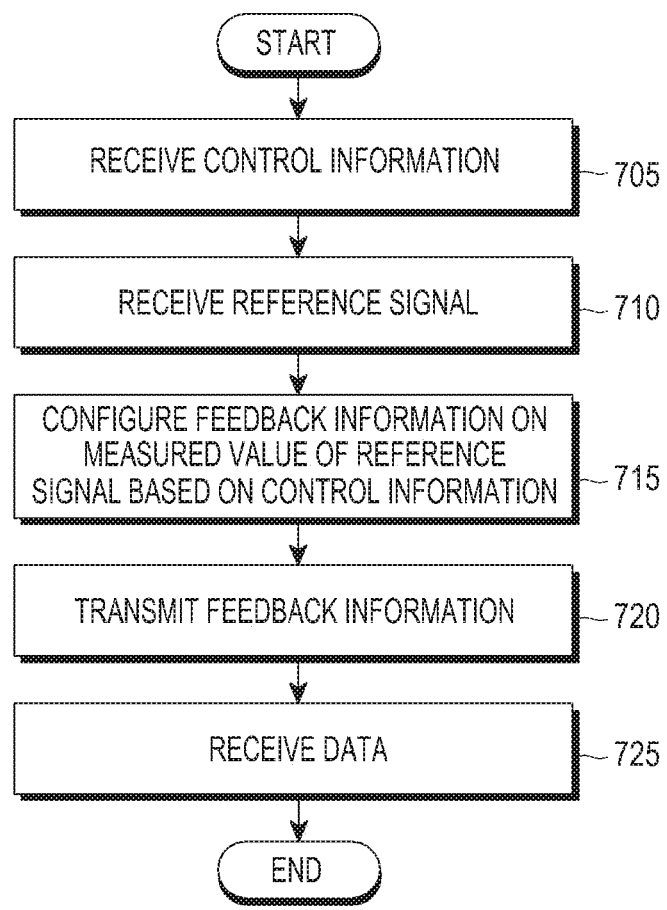
FIG. 7 is a flowchart illustrating the operation of a UE that receives a beamformed reference signal in a communication system according to an embodiment of the present disclosure.

FIG. 7 is a flowchart illustrating the operation of a UE that receives a beamformed reference signal in a communication system according to an embodiment of the present disclosure.

Referring to FIG. 7, in operation 705, the UE receives a reference signal and control information on the configuration of feedback information from an eNB. The UE receives a beamformed reference signal, that is, a BF-CSI-RS, transmitted from the eNB in operation 710, estimates a channel based on the received BF-CSI-RS, and configures feedback information on the BF-CSI-RS, for example, CSI, in operation 715. Here, the UE may configure the CSI using codebook-related information obtained from the control information received in operation 705.

The UE transmits the configured CSI to the eNB in operation 720, and receives a data signal transmitted from the eNB in operation 725. The data signal is beamformed based on the transmitted CSI.

Generally, in a TDD system, an eNB receives an SRS from a UE and determines UE-specific beamforming suitable for data transmission. In order to determine an appropriate transmission rate for a PDSCH, channel quality between the eNB and the UE is required. To this end, the eNB uses a CQI from the UE. Hereinafter, a procedure in which a UE calculates and feeds back a CQI and a procedure in which a UE further calculates and feeds back an RI are described.

It should be noted that the embodiments described below may be applied not only to SRS-based transmission but also to a system for collecting long-term feedback information from a UE using a long-term CSI-RS.

Non-codebook-based CSI reporting that feeds back a CQI using transmit diversity is described below.

An LTE system provides transmission modes that define various transmission parameters, such as the format of Downlink Control Information (DCI) to be received by a UE, the type of a resource space to search for DCI, the number of used antenna ports, transmit diversity, closed-loop spatial multiplexing, multiple-user Multiple-Input and Multiple-Output (MIMO), the use of a multicast-broadcast single-frequency network (MBSFN) subframe, dual-layer transmission, and the number of transmission layers.

Particularly, in transmission modes 9 and 10 of the LTE system, a UE may be configured to perform non-codebookbased CSI reporting. When non-codebook-based CSI reporting is used, the UE cannot know information on precoding to be used by an eNB, and thus measures and feeds transmit-diversity CQI back to the eNB. Specifically, the eNB may disable a pmi-RI-Report parameter among control signals transmitted to the UE, thereby controlling the UE to measure transmit diversity CQI.

A CQI for non-codebook-based CSI reporting is defined as follows.

An eNB transmits a pmi-RI-Report parameter to a UE configured in transmission mode 9 through a higher layer. The parameter may be provided to the UE, for example, via a Radio Resource Control (RRC) signaling message. Upon receiving the parameter, the UE derives channel measurement values for calculating a CQI value to be reported in a specific uplink subframe based on a CSI-RS on the assumption of non-zero power for the CSI-RS. When the UE in transmission mode 9 fails to receive the parameter from the higher layer or when the UE is configured in one of transmission modes 1 to 8, the UE derives a channel measurement value for a CQI based on a CRS.

A UE configured in transmission mode 10 derives a channel measurement value for calculating a CQI value to be reported in an uplink subframe corresponding to a CSI process based on a CSI-RS of non-zero power received through a CSI-RS resource configured for the CSI process.

Table 1 below illustrates pieces of CQI report configuration information to be transmitted from an eNB to a UE through a higher layer.

TABLE 2

| Transmission mode | Transmission scheme of PDSCH |
|---|---|
| 9 | If the UE is configured without PMI/RI reporting: if the number of PBCH antenna ports is one, single-antenna port, port 0; otherwise transmit diversity.<br>If the UE is configured with PMI/RI reporting: if the number of CSI-RS ports is one, single-antenna port, port 7; otherwise up to 8 layer transmission, ports 7-14 (see subclause 7.1.5B). |
| 10 | If a CSI process of the UE is configured without PMI/RI reporting: if the number of CSI-RS ports is one, single-antenna port, port7; otherwise transmit diversity.<br>If a CSI process of the UE is configured with PMI/RI reporting: if the number of CSI-RS ports is one, single-antenna port, port 7; otherwise up to 8 layer transmission, ports 7-14 (see subclause 7.1.5B). |

Referring to Table 2, when a UE in transmission mode 9 is configured not to perform PMI/RI reporting: if the number of Physical Broadcast Channel (PBCH) antenna ports is 1, the UE uses a single antenna port, that is, port 0; otherwise, the UE uses transmit diversity, that is, one or more antenna ports.

When a UE in transmission mode 10 is configured not to perform PMI/RI reporting in a particular CSI process: if the number of CSI-RS ports is 1, the UE uses a single antenna port, that is, port 7; otherwise, the UE uses transmit diversity. When the UE is configured to perform PMI/RI reporting: if the number of CSI-RS ports is 1, the UE uses a single

TABLE 1

```
CQI-ReportConfig-v920 ::=         SEQUENCE {
    cqi-Mask-r9                        ENUMERATED {setup}
    OPTIONAL,                     -- Cond cqi-Setup
    pmi-RI-Report-r9                   ENUMERATED {setup}        OPTIONAL
        -- Cond PMIRI
}
CQI-ReportConfigSCell-r10 ::=     SEQUENCE {
    cqi-ReportModeAperiodic-r10        CQI-ReportModeAperiodic OPTIONAL,
        -- Need OR
    nomPDSCH-RS-EPRE-Offset-r10        INTEGER (-1..6),
    cqi-ReportPeriodicSCell-r10        CQI-ReportPeriodic-r10
    OPTIONAL,     -- Need ON
    pmi-RI-Report-r10                  ENUMERATED {setup}
        OPTIONAL                  -- Cond PMIRISCell
}
CQI-ReportBothProc-r11 ::=        SEQUENCE {
    ri-Ref-CSI-ProcessId-r11           CSI-ProcessId-r11
    OPTIONAL,                     --Need OR
    pmi-RI-Report-r11                  ENUMERATED {setup}
        OPTIONAL                  --Need OR
}
```

| pmi-RI-Report |
|---|
| See TS 36.213 [23, 7 2]. The presence of this field means PMI/RI reporting is configured; otherwise the PMI/RI reporting is not configured. EUTRAN configures this field only when transmissionMode is set to tm8, tm9 or tm10. The UE shall ignore pmi-RI-Report-r9/ pmi-RI-Report-r10 when transmission mode 10 is configured for the serving cell on this carrier frequency. |

As shown in Table 1, each piece of CQI report configuration information may include a pmi-RT-Report parameter. When the parameter is present in the CQI report configuration information, a UE determines to perform PMI and/or RI (hereinafter referred to as PMI/RI) reporting.

Table 2 below illustrates a PDSCH transmission scheme assumed for a CSI reference resource.

antenna port, that is, port 7; otherwise, the UE may use up to eight-layer transmission, that is, ports 7 to 14.

Non-codebook-based aperiodic CSI reporting is described below.

Reporting modes supported on a PUSCH for each transmission mode are as follows.

Transmission mode 8: when a UE is configured to perform PMI/RI reporting, modes 1-2, 2-2, 3-1, and 3-2 are supported; when the UE is configured not to perform PMI/RI reporting, modes 2-0 and 3-0 are supported.

Transmission mode 9: when a UE is configured to perform PMI/RI reporting and the number of CSI-RS ports exceeds 1, modes 1-2, 2-2, 3-1, and 3-2 are supported; when the UE is configured not to perform PMI/RI reporting or the number of CSI-RS ports is 1, modes 2-0 and 3-0 are supported.

Transmission mode 10: when a UE is configured to perform PMI/RI reporting and the number of CSI-RS ports exceeds 1, modes 1-2, 2-2, 3-1, and 3-2 are supported; when the UE is configured not to perform PMI/RI reporting or the number of CSI-RS ports is 1, modes 2-0 and 3-0 are supported.

Feedback on a subband configured by a higher layer is described below.

In mode 3-0, a UE reports a wideband CQI calculated on the assumption of transmission in a set of S subbands, and also reports a subband CQI in each subband. The subband CQI value is calculated on the assumption of transmission in a corresponding subband. Even when an RI is greater than 1, the wideband CQI and the subband CQI indicate channel quality for a first codeword. In transmission mode 3, a reported CQI value is calculated under the condition of a reported RI. In other transmission modes, CQI values are reported under the condition of rank 1.

Feedback on a UE-selected subband is described below.

In mode 2-0, a UE selects a set of M preferred subbands of size k from among subband sets for separate system bandwidths and reports, to an eNB, one CQI value reflecting transmission through the M selected subbands. Even when an RI is greater than 1, the CQI indicates channel quality for a first codeword. In addition, the UE may report one wideband CQI value calculated on the assumption of transmission in a set of subbands. Even when an RI is greater than 1, the wideband CQI indicates the channel quality for the first codeword. In transmission mode 3, a reported CQI value is calculated under the condition of a reported RI. In other transmission modes, CQI values are reported under the condition of rank 1.

Non-codebook-based periodic CSI reporting is described below.

Reporting modes for periodic CSI supported on a PUCCH for each transmission mode are as follows.

Transmission mode 1: modes 1-0 and 2-0
Transmission mode 2: modes 1-0 and 2-0
Transmission mode 3: modes 1-0 and 2-0
Transmission mode 4: modes 1-1 and 2-1
Transmission mode 5: modes 1-1 and 2-1
Transmission Mode 6: modes 1-1 and 2-1
Transmission Mode 7: modes 1-0 and 2-0
Transmission Mode 8: when a UE is configured to perform PMI/RI reporting, modes 1-1 and 2-1 are supported; and when the UE is configured not to perform PMI/RI reporting, modes 1-0 and 2-0 are supported.
Transmission mode 9: when a UE is configured to perform PMI/RI reporting and the number of CSI-RS ports exceeds 1, modes 1-1 and 2-1 are supported; when the UE is configured not to perform PMI/RI reporting or the number of CSI-RS ports is 1, modes 1-0 and 2-0 are supported.
Transmission Mode 10: when a UE is configured to perform PMI/RI reporting and the number of CSI-RS ports exceeds 1, modes 1-1 and 2-1 are supported; when the UE is configured not to perform PMI/RI reporting or the number of CSI-RS ports is 1, modes 1-0 and 2-0 are supported.

Mode 1-0 for wideband feedback is described below.

In a subframe for reporting an RI for transmission mode 3, a UE determines an RI on the assumption of transmission in a set of S subbands and transmits a report including one RI to an eNB. In a subframe for reporting a CQI, the UE transmits, to the eNB, a report including one wideband CQI value calculated on the assumption of transmission in a set of S subbands. Even when an RI is greater than 1, the wideband CQI indicates channel quality for a first codeword. In transmission mode 3, a CQI is calculated with respect to the last reported periodic RI. In other transmission modes, a CQI is calculated on the assumption of transmission of rank 1.

Feedback on a UE-selected subband is described below.

In mode 2-0, in a subframe for reporting an RI for transmission mode 3, a UE determines an RI on the assumption of transmission in a set of S subbands and transmits a report including one RI to an eNB. In a subframe for reporting a wideband CQI, the UE transmits, to the eNB, a report including one wideband CQI calculated on the assumption of transmission in a set of S subbands in each reporting opportunity. Even when an RI is greater than 1, the wideband CQI indicates channel quality for a first codeword. In transmission mode 3, a CQI is calculated with respect to the last reported periodic RI. In other transmission modes, a CQI is calculated on the assumption of transmission with rank 1. The UE selects preferred subbands in a subframe for reporting selected subbands and transmits, to the eNB, a report including one CQI value reflecting transmission in some determined subbands among the preferred subbands. Each report is transmitted in sequence within each reporting opportunity. Even when an RI is greater than 1, the CQI indicates channel quality for a first codeword. In transmission mode 3, the selection of preferred subbands and the calculation of CQI values are performed based on the condition of the last reported periodic RI. In other transmission modes, a CQI is calculated on the assumption of transmission of rank 1.

Information fed back by a UE may include an inaccurate CQI value. While a data signal to be actually transmitted needs to be subjected to beamforming, a CQI calculated by the UE in the non-codebook-based CSI reporting modes does not reflect the effect of beamforming. As a result, an inaccurate CQI is fed back to an eNB, which leads to deterioration in scheduling performance of the eNB.

Non-codebook-based CSI reporting that does not feed back an RI is described below.

When non-codebook-based CSI reporting is used, a UE cannot know the rank to be used by an eNB for data transmission and thus performs CSI reporting under the assumption that RI=1. That is, when a pmi-RI-Report parameter is disabled in CSI report configuration information received from the eNB, the UE reports CSI assuming that RI=1, which is described in specification 36.213.

In order to increase a transmission rate through MIMO transmission, it is very important to determine a suitable rank for a channel between an eNB and a UE, that is, to determine whether it is appropriate to simultaneously transmit a plurality of codeword signals. In order to calculate an appropriate RI, the UE needs precoding information that the eNB applies to the UE. In a non-codebook-based CSI reporting mode, however, the UE cannot exactly know the precoding information, and thus calculates a CQI to be included in a CSI report assuming that RI=1. Therefore, the eNB cannot determine an appropriate rank, which causes deterioration in scheduling performance.

Figure 8:
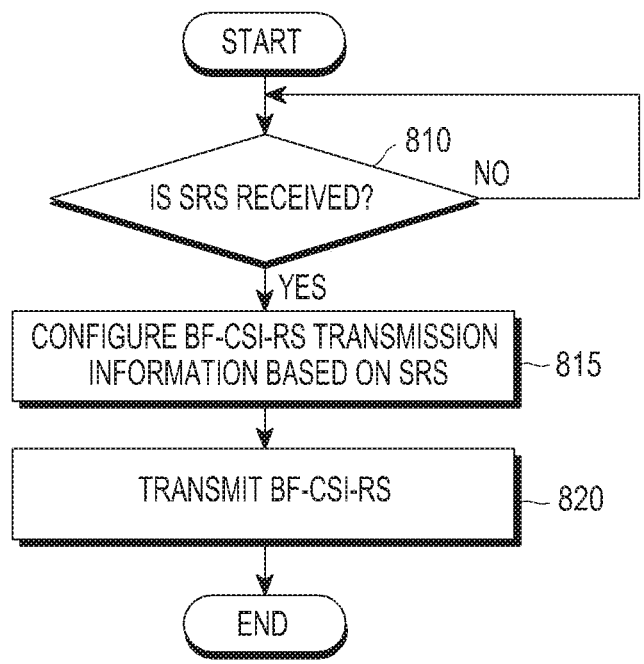
FIG. 8 is a flowchart illustrating a procedure for transmitting a beamformed CSI-RS according to an embodiment of the present disclosure.

FIG. 8 is a flowchart illustrating a procedure for transmitting a beamformed CSI-RS according to an embodiment of the present disclosure.

Referring to FIG. 8, an eNB receives an SRS from a UE in operation 810, and calculates beamforming information suitable for data transmission of the UE on the basis of channel estimation based on the received SRS in operation 815. In operation 820, the eNB transmits a CSI-RS to which the beamforming information is applied, that is, a BF-CSI-RS, to the UE.

When transmitting the BF-CSI-RS, the eNB may apply various schemes to configure a reference signal port. In one embodiment, the eNB may configure an antenna polarization-specific BF-CSI-RS in order to use the characteristics of a cross polarization antenna. Here, a pair of BF-CSI-RSs may be configured corresponding to each polarized wave.

Figure 9:
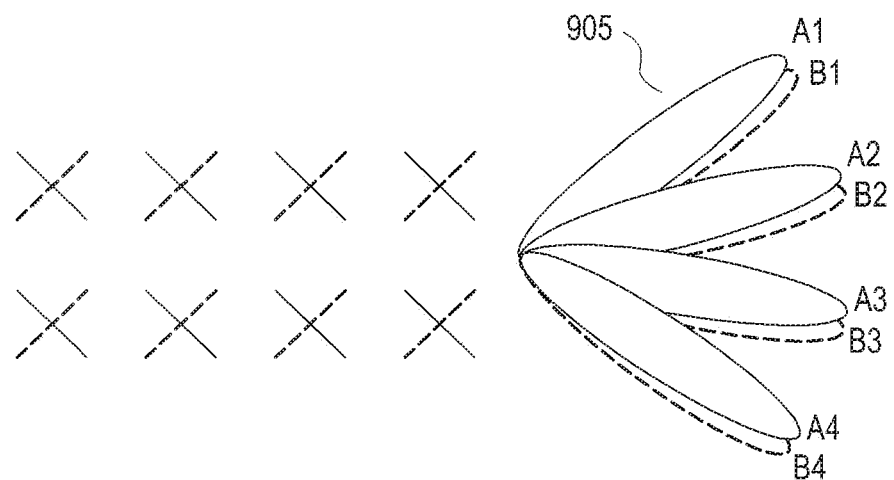
FIG. 9 illustrates an example of a port configuration used for an eNB to transmit a beamformed reference signal according to an embodiment of the present disclosure.

FIG. 9 illustrates an example of a port configuration used for an eNB to transmit a beamformed reference signal according to an embodiment of the present disclosure.

Referring to FIG. 9, the eNB may configure a total of eight reference signal ports 905 in four pairs (A1, B1), (A2, B2), (A3, B3), and (A4, B4), and may transmit a BF-CSI-RS through each port.

Beamforming information, for example, beamforming weights applied to a BF-CSI-RS transmitted through each port, is determined such that a signal is transmitted in a dominant direction in consideration of the environment of a radio channel between the eNB and a UE.

In another embodiment, the eNB may configure a BF-CSI-RS without considering antenna polarization.

Figure 10:
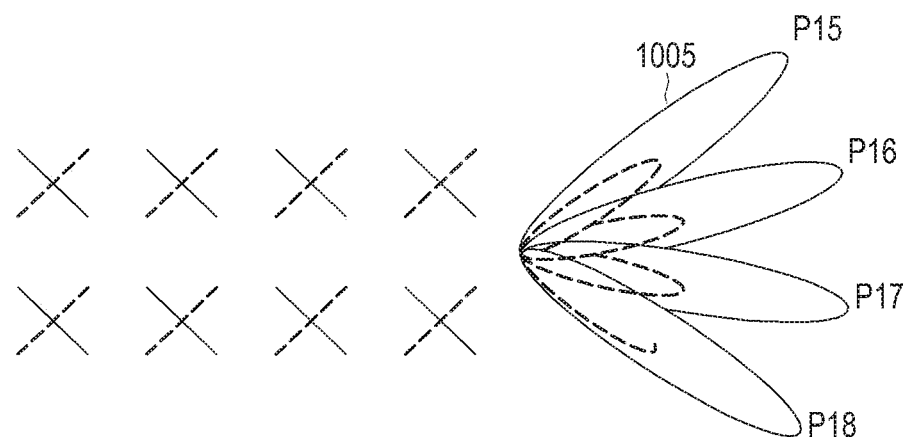
FIG. 10 illustrates an example of a port configuration for a reference signal not considering antenna polarization according to an embodiment of the present disclosure.

FIG. 10 illustrates an example of a port configuration for a reference signal not considering antenna polarization according to an embodiment of the present disclosure.

Referring to FIG. 10, an eNB may configure a total of four BF CSI-RS ports 1005 of P15, P16, P17 and P18, and may transmit a BF-CSI-RS through each port.

Beamforming weights applied to a BF-CSI-RS transmitted through each port are determined such that a signal is transmitted in a dominant direction considering the environment of a radio channel between the eNB and a UE. Specifically, the eNB may configure the beamforming weights using the eigen-value decomposition or singular-value decomposition (SVD) of channel values. For example, when a total of P BF-CSI-RS ports are configured and a beamforming weight used for a port i is $f^{(i)}$, a channel value and a beamforming weight are represented by Equation 1.

$$H = U\Sigma V^H = U\Sigma [v^{(1)} \ldots v^{(r)}]^H$$

$$f^{(1)} = v^{(1)}, \ldots, f^{(P)} = v^{(P)}, P \leq r \quad \text{[Equation 1]}$$

Here, H denotes a channel matrix, U denotes a unitary matrix, $\Sigma$ denotes a diagonal matrix of singular values, and V* denotes elements a unitary matrix of elements v(i).

The beamforming weights to be applied to the BF-CSI-RSs may be applied to the CSI-RS ports in order from a first eigenvector.

Hereinafter, the measurement of an RI and a CQI using a BF-CR-RS and non-codebook-based CSI reporting are described.

In the following embodiment, instead of calculating a CQI for feedback assuming that RI=1 without feeding back an RI, a suitable RI to maximize a transmission rate is selected based on channel estimation using a BF-CSI-RS received by a UE, and a CQI is calculated corresponding to the selected RI.

Figure 11:
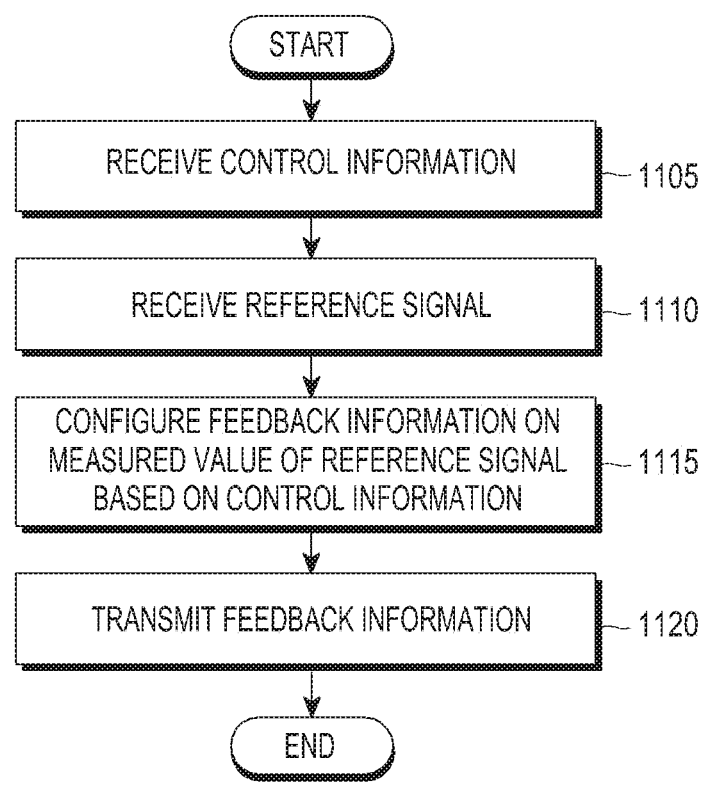
FIG. 11 is a flowchart illustrating a procedure in which a UE transmits feedback information according to an embodiment of the present disclosure.

FIG. 11 is a flowchart illustrating a procedure in which a UE transmits feedback information according to an embodiment of the present disclosure.

Referring to FIG. 11, in operation 1105, the UE receives control information on the configuration of a reference signal and feedback information from an eNB. The UE receives a beamformed reference signal, that is, a BF-CSI-RS, from the eNB in operation 1110, and configures feedback information on the BF-CSI-RS, for example, CSI, by estimating a channel based on the received BF-CSI-RS in operation 1115. Here, the UE selects an appropriate RI based on the channel estimation using the BF-CSI-RS and calculates a CQI to be fed back based on the selected RI. In operation 1120, the UE feeds back the CSI including the calculated CQI to the eNB.

Hereinafter, a procedure for determining an RI using a BF-CST-RS is described.

It is necessary for a UE to calculate an accurate RI, unlike a method of calculating channel information on the assumption of RI=1. In one embodiment, when determining an RI, the UE may calculate the RI assuming that a. CSI-RS port is transmitted by rank. For example, signal transmission on port 15 is assumed for rank 1, simultaneous transmissions on ports 15 and 16 are assumed for rank 2, and signal transmission by rank may be assumed for higher ranks according to the same principle.

Figure 12:
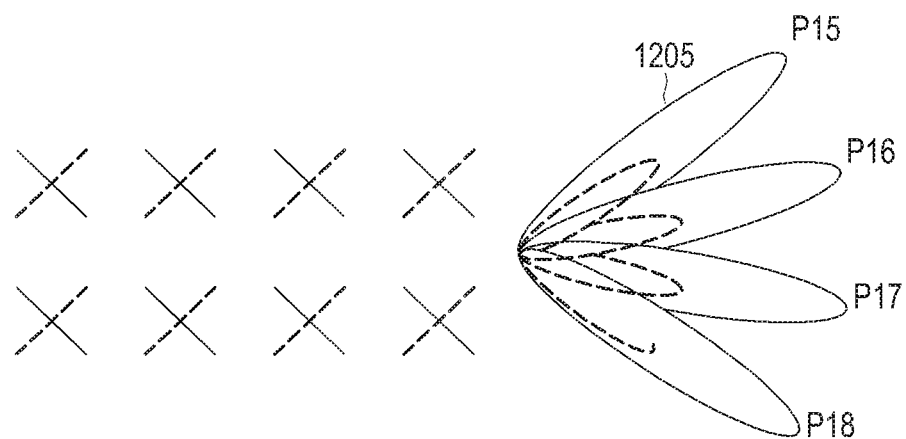
FIG. 12 illustrates a mapping of rank-specific CSI-RS ports according to an embodiment of the present disclosure.

FIG. 12 illustrates mapping of rank-specific CSI-RS ports according to an embodiment of the present disclosure.

Referring to FIG. 12, an eNB may configure a total of four BF-CSI-RS ports 1205 including P15, P16, P17, and P18, and may transmit a BF-CSI-RS through each port.

A UE calculates an RI, assuming signal transmission through port 15 for rank 1, signal transmission through ports 15 and 16 for rank 2, signal transmission through ports 15, 16, and 17 for rank 3, and signal transmission through ports 15, 16, 17, and 18 for rank 4.

After the RI to be fed back is determined, the UE calculates a CQI to be fed back based on the determined RI. Considering the limited transmission power of the eNB, when the rank is high, transmission power per data stream becomes small. Therefore, it is necessary to calculate the CQI in consideration of a transmission power change. In codebook-based feedback, since transmission power normalization has already been applied to a codebook, the UE can reflect the decrease in transmission power only by selecting the codebook. On the other hand, in non-codebook-based feedback, the UE needs to directly reflect the decrease in transmission power.

For example, when calculating a CQI on the assumption of rank 2, the UE calculates a CQI for each data stream assuming that the transmission power of the eNB is reduced by 3 dB compared to when calculating a CQI on the assumption of rank 1. Even if the rank is greater, the UE can calculate a CQI assuming transmission power normalization for each data stream.

Equation 2 below represents the calculation of a CQI described above.

$$C_{rank1} = f(\tilde{H}F_{rank1}), \quad \text{[Equation 2]}$$

$$F_{rank1} = \text{Port 15 transmission}$$

$$\rightarrow CQI_1 = f(C_{rank1})$$

$$C_{rank2} = f(\tilde{H}F_{rank2}),$$

-continued $F_{rank2}$ = Port 15 and 16 transmission $$\rightarrow CQI_1 = f(\tilde{H}F_{port15}/\sqrt{2}),$$
$$CQI_2 = f(\tilde{H}F_{port16}/\sqrt{2})$$

Here, $CQI_i$ denotes a CQI calculated on the assumption of rank i; $F_{ranki}$ and $F_{portj}$ denote precoding matrices obtained on the assumption of transmission through rank i and port j, respectively; tilde_H denotes an estimated channel matrix; and f denotes a predetermined function.

In one embodiment of the present disclosure, the eNB and the UE may calculate an RI and a CQI based on a prearranged codebook in order to perform non-codebook-based CSI reporting. The codebook is not fed back by the UE to the eNB but is known in advance to the eNB and the UE for the calculation of an RI. In one embodiment, the eNB may provide the codebook in advance to the UE through an higher-layer signaling message.

In one example, the codebook may be configured as shown in Table 3 below. In the following example, the codebook includes precoders for 1 to 8-layers non-codebook-based CSI reporting using antenna ports 15-22.

PDSCH signals on antenna ports {7 . . . 6+v} for v layers are the same as corresponding symbols transmitted on antenna ports {15 . . . 14+v} and are represented by Equation 3.

$$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix} \quad [\text{Equation 3}]$$

Here, x(i) is the vector of symbols to be transmitted, obtained by layer mapping; y(i) is an output vector obtained by applying precoder W(i) to x(i); and $P \in \{1,2,4,8\}$ is the number of CSI-RS ports configured for a UE. When one CSI-RS port is configured, W(i), which indicates a precoder assumed by the UE, is 1; otherwise, W(i) is a precoding matrix corresponding to an RI to be reported (or v to be reported), which is applicable to x(i).

To perform non-codebook-based CSI reporting, the eNB and the UE may calculate an RI and a CQI based on a prearranged precoding matrix. For example, when $W_{rank1}$ is defined as a precoding matrix used for 1-layer transmission

TABLE 3

| Layer | 1-layer | 2-layers | 3-layers | 4-layers | 5-layers |
|---|---|---|---|---|---|
| Port 15 to 16 | $\begin{bmatrix}1\\0\end{bmatrix}$ | $\frac{1}{\sqrt{2}}\begin{bmatrix}1 & 0\\0 & 1\end{bmatrix}$ | — | — | — |
| Port 15 to 18 | $\begin{bmatrix}1\\0\\0\\0\end{bmatrix}$ | $\frac{1}{\sqrt{2}}\begin{bmatrix}1 & 0\\0 & 1\\0 & 0\\0 & 0\end{bmatrix}$ | $\frac{1}{\sqrt{3}}\begin{bmatrix}1 & 0 & 0\\0 & 1 & 0\\0 & 0 & 1\\0 & 0 & 0\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ | — |
| Port 15 to 22 | $\begin{bmatrix}1\\0\\0\\0\\0\\0\\0\\0\end{bmatrix}$ | $\frac{1}{\sqrt{2}}\begin{bmatrix}1 & 0\\0 & 1\\0 & 0\\0 & 0\\0 & 0\\0 & 0\\0 & 0\\0 & 0\end{bmatrix}$ | $\frac{1}{\sqrt{3}}\begin{bmatrix}1 & 0 & 0\\0 & 1 & 0\\0 & 0 & 1\\0 & 0 & 0\\0 & 0 & 0\\0 & 0 & 0\\0 & 0 & 0\\0 & 0 & 0\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\\0 & 0 & 0 & 0\\0 & 0 & 0 & 0\\0 & 0 & 0 & 0\\0 & 0 & 0 & 0\end{bmatrix}$ | $\frac{1}{\sqrt{5}}\begin{bmatrix}1 & 0 & 0 & 0 & 0\\0 & 1 & 0 & 0 & 0\\0 & 0 & 1 & 0 & 0\\0 & 0 & 0 & 1 & 0\\0 & 0 & 0 & 0 & 1\\0 & 0 & 0 & 0 & 0\\0 & 0 & 0 & 0 & 0\\0 & 0 & 0 & 0 & 0\end{bmatrix}$ |

| Layer | 6-layers | 7-layers | 8-layers |
|---|---|---|---|
| Port 15 to 16 | — | — | — |
| Port 15 to 18 | — | — | — |
| Port 15 to 22 | $\frac{1}{\sqrt{6}}\begin{bmatrix}1 & 0 & 0 & 0 & 0 & 0\\0 & 1 & 0 & 0 & 0 & 0\\0 & 0 & 1 & 0 & 0 & 0\\0 & 0 & 0 & 1 & 0 & 0\\0 & 0 & 0 & 0 & 1 & 0\\0 & 0 & 0 & 0 & 0 & 1\\0 & 0 & 0 & 0 & 0 & 0\\0 & 0 & 0 & 0 & 0 & 0\end{bmatrix}$ | $\frac{1}{\sqrt{7}}\begin{bmatrix}1 & 0 & 0 & 0 & 0 & 0 & 0\\0 & 1 & 0 & 0 & 0 & 0 & 0\\0 & 0 & 1 & 0 & 0 & 0 & 0\\0 & 0 & 0 & 1 & 0 & 0 & 0\\0 & 0 & 0 & 0 & 1 & 0 & 0\\0 & 0 & 0 & 0 & 0 & 1 & 0\\0 & 0 & 0 & 0 & 0 & 0 & 1\\0 & 0 & 0 & 0 & 0 & 0 & 0\end{bmatrix}$ | $\frac{1}{\sqrt{8}}\begin{bmatrix}1 & 0 & 0 & 0 & 0 & 0 & 0 & 0\\0 & 1 & 0 & 0 & 0 & 0 & 0 & 0\\0 & 0 & 1 & 0 & 0 & 0 & 0 & 0\\0 & 0 & 0 & 1 & 0 & 0 & 0 & 0\\0 & 0 & 0 & 0 & 1 & 0 & 0 & 0\\0 & 0 & 0 & 0 & 0 & 1 & 0 & 0\\0 & 0 & 0 & 0 & 0 & 0 & 1 & 0\\0 & 0 & 0 & 0 & 0 & 0 & 0 & 1\end{bmatrix}$ |

In one embodiment, the UE may operate as follows to assume the generation of a PDSCH signal in calculating a CQI.

and $W_{rank2}$ is defined as a precoding matrix used for 2-layer transmission, the UE may determine an RI assuming $W_{rank1}$ and $W_{rank2}$, and the eNB may transmit a data signal assuming $W_{rank1}$ and $W_{rank2}$, known in advance, when applying the RI fed back from the UE to the transmission of a data signal. The same method may be applied for two- or more-layer transmission.

Table 4 below illustrates another example of precoding matrices prearranged between the eNB and the UE.

and when eight CSI-RS ports are configured, W(i) corresponds to codebook index C, given for a corresponding number of layers.

Here, A, B, and C may have a value of 0 or a random value. Further, C may have two values. For example, for C, i1=0 and i2=0 or two other random values may be used.

TABLE 4

| | 2Tx | 4Tx |
|---|---|---|
| Rank 1 | $W_{rank1,2Tx} \in \left\{ \begin{bmatrix} 1 \\ 0 \end{bmatrix}, \frac{1}{\sqrt{2}} \begin{bmatrix} 1 \\ 1 \end{bmatrix} \right\}$ | $W_{rank1,4Tx} \in \left\{ \begin{bmatrix} 1 \\ 0 \\ 0 \\ 0 \end{bmatrix}, \frac{1}{\sqrt{2}} \begin{bmatrix} 1 \\ 1 \\ 0 \\ 0 \end{bmatrix}, \frac{1}{2} \begin{bmatrix} 1 \\ 1 \\ 1 \\ 1 \end{bmatrix} \right\}$ |
| Rank 2 | $W_{rank2,2Tx} \in \left\{ \frac{1}{\sqrt{2}} \begin{bmatrix} 1 & 0 \\ 0 & 1 \end{bmatrix}, \frac{1}{2} \begin{bmatrix} 1 & 1 \\ 1 & 1 \end{bmatrix}, \frac{1}{2} \begin{bmatrix} 1 & 1 \\ 1 & -1 \end{bmatrix} \right\}$ | $W_{rank2,4Tx} \in \left\{ \frac{1}{\sqrt{2}} \begin{bmatrix} 1 & 0 \\ 0 & 1 \\ 0 & 0 \\ 0 & 0 \end{bmatrix}, \frac{1}{2} \begin{bmatrix} 1 & 0 \\ 1 & 0 \\ 0 & 1 \\ 0 & 1 \end{bmatrix}, \frac{1}{\sqrt{8}} \begin{bmatrix} 1 & 1 \\ 1 & -1 \\ 1 & 1 \\ 1 & -1 \end{bmatrix}, \frac{1}{\sqrt{8}} \begin{bmatrix} 1 & 1 \\ 1 & -1 \\ 1 & 1 \\ 1 & -1 \end{bmatrix} \right\}$ |
| Rank 3 | $W_{rank3,4Tx} \in \left\{ \frac{1}{\sqrt{12}} \begin{bmatrix} 1 & 1 & 1 \\ 1 & 1 & -1 \\ 1 & -1 & -1 \\ 1 & -1 & 1 \end{bmatrix} \right\}$ | $W_{rank4,4Tx} \in \left\{ \frac{1}{\sqrt{16}} \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \right\}$ |

In one embodiment, the UE may operate as follows to assume the generation of a PDSCH signal in calculating a CQI.

PDSCH signals on antenna ports {7 . . . 6+v} for v layers are the same as corresponding symbols transmitted on antenna ports {15 . . . 14+v} and are represented by Equation 3.

Here, when one CSI-RS port is configured, W(i) is 1; when two CSI-RS ports are configured and a reported RI is 1, W(i) is $W_{rank1,2Tx}$; when two CSI-RS ports are configured and a reported RI is 2, W(i) is $W_{rank2,2Tx}$; when four CSI-RS ports are configured and a reported RI is 1, W(i) is $W_{rank1,4Tx}$; when four CSI-RS ports are configured and a reported RI is 2, W(i) is $W_{rank2,4Tx}$; when four CSI-RS ports are configured and a reported RI is 3, W(i) is $W_{rank3,4Tx}$; and when four CSI-RS ports are configured and a reported RI is 4, W(i) is $W_{rank4,4Tx}$.

In one embodiment, the codebook, prearranged between the eNB and the UE to perform non-codebook-based CSI reporting, may be a codebook previously used in the LTE standard. For example, the codebook may be a 2Tx codebook defined in LTE Release 8 or a 4Tx codebook defined in LTE Release 8. In another embodiment, a particular codeword from the codebook previously used in the LTE standard may be extended to be applied for non-codebook-based CSI reporting. Then, the UE may operate as follows to assume the generation of a PDSCH signal in calculating a CQI.

PDSCH signals on antenna ports {7 . . . 6+v} for v layers are the same as corresponding symbols transmitted on antenna ports {15 . . . 14+v} and are represented by Equation 3.

Here, when one CSI-RS port is configured, W(i) is 1.

When two CSI-RS ports are configured, W(i) corresponds to codebook index A for all layers given in the LTE standard, when four CSI-RS ports are configured, W(i) corresponds to codebook index B for all layers given in the LTE standard, In one embodiment, A, B, and C may be assigned different values in respective layers. In this case, the UE may operate as follows to assume the generation of a PDSCH signal in calculating a CQI.

PDSCH signals on antenna ports {7 . . . 6+v} for v layers are the same as corresponding symbols transmitted on antenna ports {15 . . . 14+v}, and are represented by Equation 3.

Here, when one CSI-RS port is configured, W(i) is 1; when two CSI-RS ports are configured and a reported RI is 1, W(i) is codebook index A1 having v=1; when two CSI-RS ports are configured and a reported RI is 2, W(i) is codebook index A2 having v=2; when four CSI-RS ports are configured and a reported RI is 1, W(i) is codebook index B1 having v=1; when four CSI-RS ports are configured and a reported RI is 2, W(i) is codebook index B2 having v=2; when four CSI-RS ports are configured and a reported RI is 3, W(i) is codebook index B3 having v=3; and when four CSI-RS ports are configured and a reported RI is 4, W(i) is codebook index B4 having v=4.

The foregoing embodiment may be extended and applied in the same manner when eight ports are used. Further, A1, A2, B1, B2, B3, and B4 may be assigned different values.

Hereinafter, an embodiment is described in which predefined precoding matrices available for non-codebook-based CSI reporting are set through higher-layer signaling.

In performing non-codebook-based CSI reporting, an eNB and a UE may select an RI and a CQI based on prearranged precoding matrices, wherein the prearranged precoding matrices may be set through higher-layer signaling, such as RRC signaling.

Figure 13:
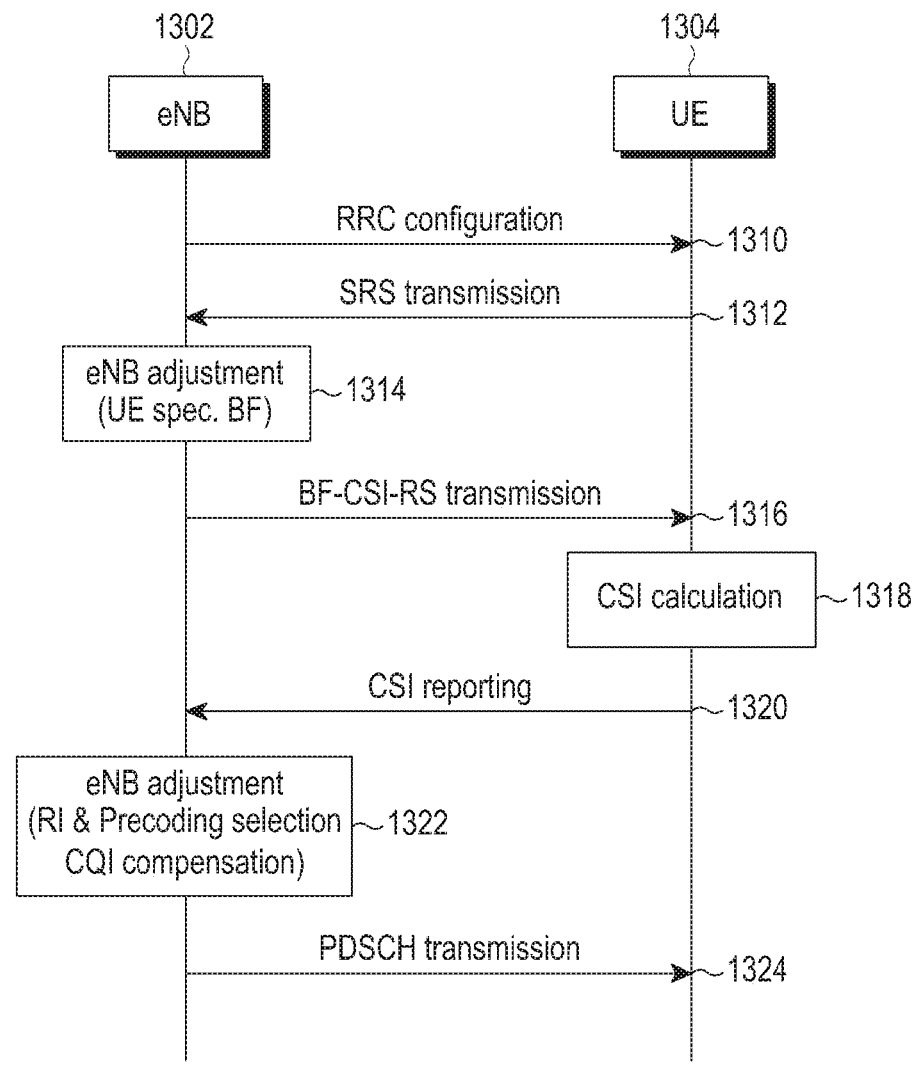
FIG. 13 illustrates a scenario in which non-codebook-based CSI reporting is performed in a wireless communication system according to an embodiment of the present disclosure.

FIG. 13 illustrates a scenario in which non-codebook-based CSI reporting is performed in a wireless communication system according to an embodiment of the present disclosure. The illustrated scenario includes communication between an eNB 1302 and a UE 1304.

Referring to FIG. 13, in operation 1310, the eNB 1302 transmits an RRC configuration message including various pieces of configuration information necessary for wireless communication with the UE 1304 to the UE 1304. For example, the RRC configuration message may include information indicating a codebook including precoding matrices available for the UE 1304.

The UE 1304 transmits an SRS to the eNB 1302 in operation 1312, and the eNB 1300 determines first beamforming information for performing UE-specific precoding based on channel estimation using the received SRS. Although not shown, when a CSI-RS transmitted for a long time is used instead of an SRS, operation 1312 may be replaced with an operation in which the eNB 1302 transmits a long-term CSI-RS to the UE 1304 and receives channel state information from the UE 1304.

In operation 1316, the eNB 1302 transmits a BF-CSI-RS to the UE 1304 according to the first beamforming inforotherwise, W(i) denotes a precoding matrix selected by the eNB through higher-layer signaling.

In another embodiment, when two or more CSI-RS ports are configured, W(i) is a precoding matrix corresponding to an RI to be reported (or v to be reported), which is applicable to x(i), and may be assigned through higher-layer signaling.

Hereinafter, a channel feedback scheme that further reports a PMI is described.

A UE may select a precoding matrix corresponding to an optimal codeword from a codebook prearranged between an eNB and the UE, and may transmit the PMI of the selected precoding matrix, along with an CQI and an RI, to the eNB. The codebook may be configured, for example, as shown in Table 5 below.

TABLE 5

| | 2Tx |
|---|---|
| Rank 1 | $W_{rank1,2Tx} \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} 1 \\ 0 \end{bmatrix}, \begin{bmatrix} 0 \\ 1 \end{bmatrix} \right\}$ |
| Rank 2 | $W_{rank2,2Tx} \in \left\{ \frac{1}{\sqrt{2}}\begin{bmatrix} 1 & 0 \\ 0 & 1 \end{bmatrix}, \frac{1}{\sqrt{2}}\begin{bmatrix} 1 & 1 \\ 1 & -1 \end{bmatrix}, \frac{1}{\sqrt{2}}\begin{bmatrix} 1 & 1 \\ j & -j \end{bmatrix}, \frac{1}{\sqrt{2}}\begin{bmatrix} 1 & 1 \\ 1 & j \end{bmatrix}, \frac{1}{\sqrt{2}}\begin{bmatrix} 1 & 1 \\ 1 & -j \end{bmatrix}, \frac{1}{\sqrt{2}}\begin{bmatrix} 1 & 1 \\ j & 1 \end{bmatrix}, \frac{1}{\sqrt{2}}\begin{bmatrix} 1 & 1 \\ j & -1 \end{bmatrix} \right\}$ | mation. The first beamforming information may include a precoding matrix suitably selected for the UE 1304. In operation 1318, the UE 1304 calculates CSI based on the measurement result of the received BF-CSI-RS. When the UE is configured not to perform PMI reporting, the UE may determine an RI and a CQI for feedback based on a codebook indicated by the RRC configuration message.

In operation 1320, the UE 1304 reports CSI including the RI and the CQI to the eNB 1302. In operation 1322, the eNB 1302 compensates for the RI and the CQI to be applied to downlink transmission and performs precoding adjustment based on the codebook, which is indicated by the RRC configuration message and is used for the UE to determine the RI and the CQI, and the reported CSI, thereby determining second beamforming information. In operation 1324, the eNB 1302 transmits a data signal to which transmission port-specific beamforming is applied according to the second beamforming information to the UE 1304 through a PDSCH.

In one embodiment, the RRC configuration message may include the following configuration information.

```
CQI-ABC-r1x ::= SEQUENCE {
codebook-no-pmi-Report-r1x ENUMERATED {setup} or BIT STRING
OPTIONAL
}
```

A codebook-no-pmi-Report parameter included in the CQI-ABC information designates a Precoding Matrix Index (PMI) used for the UE to calculate the RI and the CQI when non-codebook-based CSI reporting is used and the number of CSI-RS antenna ports is two or greater.

In one embodiment, the UE may operate as follows to assume the generation of a PDSCH signal in calculating a CQI.

PDSCH signals on antenna ports {7 ... 6+v} for u layers are the same as corresponding symbols transmitted on antenna ports {15 ... 14+v} and are represented by Equation 3. Here, when one CSI-RS port is configured, W(i) is 1;

To indicate the codebook, higher-layer signaling, illustrated below, may be used.

```
AntennaInfo-ABC-r1x ::= SEQUENCE {
    alternativeCodebookEnabledForABC-r1x      BOOLEAN or
ENUMERATED or BIT STRING
}
```

An alternativeCodebookEnabledForABC parameter included in the AntennaInfo-ABC information indicates that a prearranged codebook, for example, the codebook illustrated in Table 5, is used when non-codebook-based CSI reporting is used.

In one embodiment, the eNB may transmit higher-layer signaling illustrated below to the UE in order to indicate to the UE that non-codebook-based CSI reporting is used.

```
CQI-ReportXYZ-r1y ::= SEQUENCE {
RI-CQI-Report-r1y ENUMERATED {setup}
}
```

That is, an RI-CQI-Report parameter included in CQI-ReportXYZ indicates to the UE that non-codebook-based CSI reporting which feeds back an RI and a CQI is used. That is, when RRC signaling transmitted from the eNB to the UE includes this parameter, the UE is configured not to report a PMI.

In this case, the UE may assume a PDSCH transmission scheme based on a transmission mode configured for the UE in order to calculate a CQI.

Table 6 below illustrates one example of a PDSCH transmission scheme assumed for a CSI reference resource.

TABLE 6

| Transmission mode | Transmission scheme of PDSCH |
|---|---|
| 9 | If the UE is configured without PMI/RI reporting: if the number of PBCH antenna ports is one, single-antenna port, port 0; otherwise transmit diversity. If the UE is configured with RI/CQI reporting: if |

TABLE 6-continued

| Transmission mode | Transmission scheme of PDSCH |
|---|---|
| | the number of PBCH antenna ports is one, single-antenna port, port 0, otherwise up to 8 layer transmission, port 7-14. |
| | If the UE is configured with PMI/RI reporting: if the number of CSI-RS ports is one, single-antenna port, port 7; otherwise up to 8 layer transmission, ports 7-14. |
| 10 | If a CSI process of the UE is configured without PMI/RI reporting: if the number of CSI-RS ports is one, single-antenna port, port7; otherwise transmit diversity. |
| | If a CSI process of the UE is configured with RI/CQI reporting: if the number of CSI-RS ports is one, single-antenna port, port 0, otherwise* up to 8 layer transmission, port 7-14. |
| | If a CSI process of the UE is configured with PMI/RI reporting: if the number of CSI-RS ports is one, single-antenna port, port 7; otherwise up to 8 layer transmission, ports 7-14. |

Table 7 below illustrates another example of a PDSCH transmission scheme assumed for a CSI reference resource.

TABLE 7

| Transmission mode | Transmission scheme of PDSCH |
|---|---|
| 9 | If the UE is configured without PMI/RI reporting: if the number of PBCH antenna ports is one, single-antenna port, port 0; otherwise transmit diversity |
| | If the UE is configured with RI/CQI reporting or PMI/RI reporting: if the number of PBCH antenna ports is one, single-antenna port, port 0, otherwise up to 8 layer transmission, port 7-14. |
| 10 | If a CSI process of the UE is configured without PMI/RI reporting: if the number of CSI-RS ports is one, single-antenna port, port7; otherwise transmit diversity |
| | If a CSI process of the UE is configured with RI/CQI reporting or PMI/RI reporting: if the number of CSI-RS ports is one, single-antenna port, port 0, otherwise* up to 8 layer transmission, port 7-14. |

In one embodiment, the UE may operate as follows in order to calculate channel information for CSI reporting.

In modes 3-0 and 2-0 for aperiodic CSI reporting, CQI values to be reported about transmission mode 3 are calculated based on an RI to be reported. In transmission modes 9 and 10, when a parameter indicating non-codebook-based CSI reporting through higher-layer signaling, for example, RI-CQI-Report information, is configured for the UE, CQI values to be reported are calculated based on an RI to be reported. Otherwise, CQI values to be reported are calculated based on rank 1.

In modes 1-0 and 2-0 for periodic CSI reporting, in a subframe for reporting an RI, the UE determines an RI on the assumption of transmission in a set of S subbands and transmits a report including one RI to the eNB. In a subframe for reporting a (wideband) CQI, in transmission mode 3, a CQI is calculated for the last reported periodic RI. In a subframe for reporting a (wideband) CQI, in transmission modes 9 and 10, when a parameter indicating non-codebook-based CSI reporting through higher-layer signaling, for example, RI-CQI-Report information, is configured for the UE, a CQI is calculated for the last reported periodic RI. In other transmission modes, a CQI is calculated on the assumption of transmission with rank 1. In a subframe for reporting a CQI about a selected subband, in transmission mode 3, a preferred subband is selected and CO values are calculated based on the last reported periodic RI. In a subframe for reporting a CQI about a selected subband, in transmission modes 9 and 10, when a parameter indicating non-codebook-based CSI reporting through higher-layer signaling, for example, RI-CQI-Report information, is configured for the UE, a CQI is calculated for the last reported periodic RI. In other transmission modes, a CQI is calculated on the assumption of rank 1.

In another embodiment, the eNB may indicate to the UE that non-codebook CSI reporting is used by combining higher-layer signaling that indicates a CSI reporting class and higher-layer signaling that indicates the measurement of transmit diversity CQI. To this end, the eNB may transmit the following higher-layer signaling to the UE.

```
CSI-Process-r1y ::= SEQUENCE {
csi-reporting-class ENUMERATED {class X, class Y, class Z},
}
CQI-ReportABC-r1x ::= SEQUENCE {
pmi-RI-Report-r1x ENUMERATED {setup}   OPTIONAL -- Need OR
}
```

Here, a csi-reporting-class parameter included in the CSI-Process information designates a CSI reporting class for the UE. Here, classes X, Y, Z, and B may be used.

Also, a pmi-RI-Report parameter included in the CQI-ReportABC information is used to instruct the UE to configure PMI/RI reporting. When this parameter is included in the CQI report configuration information, the UE determines to perform PMI/RI reporting. When the parameter does not exist, the UE determines that PMI/RI reporting is not configured. The eNB may set this parameter when transmission mode 8, 9, or 10 is configured. The UE may ignore this parameter when transmission mode 10 is configured for a serving cell on the current carrier frequency.

When the CST reporting class and the pmi-RI-report parameter are not set by the eNB, the TIE determines to perform non-codebook-based CSI reporting. The UE may operate according to Table 8 to assume the generation of a PDSCH signal in calculating a CQI.

TABLE 8

| Transmission mode | Transmission scheme of PDSCH |
|---|---|
| 9 | If the UE is configured without PMI/RI reporting: if the number of PBCH antenna ports is one, single-antenna port, port 0; if the UE is configured with Class X CSI reporting, up to 8 layer transmission, port 7-14; otherwise transmit diversity. |
| 10 | If a CSI process of the UE is configured without PMI/RI reporting: if the number of CSI-RS ports is one, single-antenna port, port7; if a CSI process with Class X CSI reporting of the UE is configured, up to 8 ayer transmission, port 7-14; otherwise transmit diversity. |

The UE makes the following assumptions in order to determine a CQI index and, if necessary, a PMI and an RI in a CSI reference resource.

CSI reporting on transmission mode 9 is performed as follows.

When the UE is configured not to perform PMI reporting (or is configured not to perform PMI/RI reporting) and is configured with class X (or class B) for CSI reporting, UE-specific reference signal overhead corresponds to that in the last reported rank with respect to more than one CSI-RS port and corresponds to that in transmission with rank 1 with respect to a single CST-RS port. PDSCH signals on antenna ports {7 ... 6+v} for v layers are the same as corresponding symbols transmitted on antenna ports {15 ... 14+v} and are represented by Equation 3.

Here, when one CSI-RS port is configured, W(i) is 1. Otherwise, when two CSI-RS ports are configured, W(i) is codebook index A for all layers; when four CSI-RS ports are configured, W(i) is codebook index B for all layers; when eight CSI-RS ports are configured, W(i) is codebook index C for a corresponding number of layers. Corresponding PDSCH signals transmitted on antenna ports {15 ... 14+v} have the ratio of CSI-RS Energy Per Resource Element (EPRE) to EPRE which is equal to a given value.

When a CSI process is configured not to perform PMI/RI reporting, CSI reporting on transmission mode 10 is performed as follows.

When more than one CSI-RS port is configured for a relevant CSI-RS resource and the UE is configured with class X (or class B) for CSI reporting, CRS Resource Elements (REs) are present in non-Multicast-Broadcast Single-Frequency Network (MBSFN) subframes, and CRS overhead is considered to be equal to CRS overhead corresponding to the number of CRS antenna ports of a serving cell. 1LE-specific reference signal overhead corresponds to that in the last reported rank with respect to more than one CSI-RS port and corresponds to that in transmission with rank 1 with respect to a single CSI-RS port. UE-specific reference signal overhead corresponds to that in transmission with rank 1 with respect to a single CSI-RS port. PDSCH signals on antenna ports {7 ... 6+v} for v layers are the same as corresponding symbols transmitted on antenna ports {15 ... 14+v}, and are represented by Equation 3.

Here, when P=1, W(i) is 1. Otherwise, when two CSI-RS ports are configured, W(i) is codebook index A for all layers; when four CSI-RS ports are configured, W(i) is codebook index B for all layers; when eight CSI-RS ports are configured, W(i) is codebook index C for a corresponding number of layers. Corresponding PDSCH signals transmitted on antenna ports {15 ... 14+v} have a ratio of CSI-RS EPRE to EPRE that is equal to a given value.

It is assumed that no REs are allocated for a CSI-RS and a non-zero CSI-RS.

Codebook indexes used in the aforementioned embodiments may indicate precoders assigned by higher-layer signaling and/or predefined precoders.

In another embodiment, a codebook subset restriction may be applied to the predefined precoder, thereby limiting the number of codewords that the UE can calculate.

The UE assumes the following in order to determine a CQI index and, if necessary, a PMI and an RI in a CSI reference resource.

CSI reporting on transmission mode 9 is performed as follows.

When the UE is configured not to perform PMI/RI reporting (or PMI reporting) and is configured with class X (or class B) for CSI reporting, UE-specific reference signal overhead corresponds to that in the last reported rank with respect to more than one CSI-RS port and corresponds to that in transmission with rank 1 with respect to a single CSI-RS port. PDSCH signals on antenna ports {7 ... 6+v} for v layers are the same as corresponding symbols transmitted on antenna ports {15 ... 14+v} and are represented by Equation 3.

Here, when one CSI-RS port is configured, W(i) is 1. Otherwise, W(i) is a precoding matrix corresponding to a PMI configured by higher-layer signaling (for example, a codebook subset restriction). Corresponding PDSCH signals transmitted on antenna ports {15 ... 14+v} have a ratio of CSI-RS EPRE to EPRE that is equal to a given value.

When a CSI process is configured not to perform PMI/RI reporting (or PMI reporting), CSI reporting on transmission mode 10 is performed as follows.

When more than one CSI-RS port is configured for a relevant CSI-RS resource and the UE is configured with class X (or class B) for CSI reporting. CRS REs are present in non-MBSFN subframes and CRS overhead is considered to be equal to CRS overhead corresponding to the number of CRS antenna ports of a serving cell. 1lE-specific reference signal overhead corresponds to that in the last reported rank with respect to more than one CSI-RS port and corresponds to that in transmission with rank 1 with respect to a single CSI-RS port. UE-specific reference signal overhead corresponds to that in transmission with rank 1 with respect to a single CSI-RS port. PDSCH signals on antenna ports {7 ... 6+v} for v layers are the same as corresponding symbols transmitted on antenna ports {15 ... 14+v} and are represented by Equation 3.

Here, when P=1, W(i) is 1. Otherwise, W(i) is a precoding matrix corresponding to a PMI configured by higher-layer signaling (for example, a codebook subset restriction). Corresponding PDSCH signals transmitted on antenna ports {15 ... 14+v} have a ratio of CSI-RS EPRE to EPRE that is equal to a given value.

It is assumed that no REs are allocated for a CSI-RS and a non-zero CSI-RS.

In modes 3-0 and 2-0 for aperiodic CSI reporting, when the UE is configured in transmission mode 9 or in transmission mode 9 or 10 having class X for CSI reporting, CQI values to be reported are calculated based on an to be reported. Otherwise, CQI values to be reported are calculated based on rank 1.

In modes 1-0 and 2-0 for periodic CSI reporting, in a subframe for reporting an RI, the UE determines an RI on the assumption of transmission in a set of S subbands and transmits a report including one RI to the eNB. In a subframe for reporting a (wideband) CQI, when the UE is configured in transmission mode 3 or in transmission mode 9 or 10 having class X for CSI reporting, a preferred subband is selected and CO values are calculated based on the last reported periodic RI. Otherwise, CQI values to be reported are calculated on the assumption of rank 1.

Depending on the precoding type used for CSI reporting, the eNB may apply additional antenna virtualization after beamforming.

Figure 14:
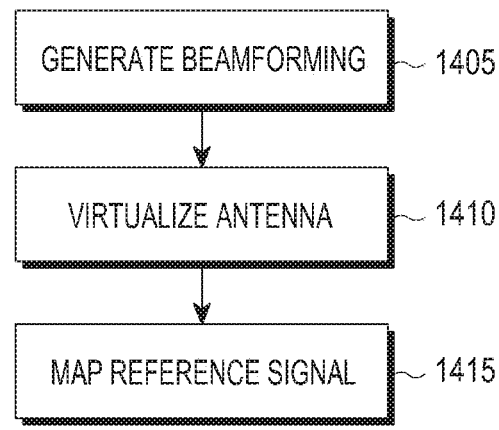
FIG. 14 illustrates a first beamforming adjustment process of an eNB including antenna virtualization according to an embodiment of the present disclosure.

FIG. 14 illustrates a first beamforming adjustment process of an eNB including antenna virtualization according to an embodiment of the present disclosure.

Referring to FIG. 14, in operation 1405, the eNB determines first beamforming information, for example, a precoding matrix, based on feedback information on an SRS received from a UE or on a long-term CSI-RS. In operation 1410, the eNB applies additional antenna virtualization to the first beamforming information. In operation 1415, the eNB generates a reference signal mapped to the antenna virtualization-applied first beamforming information, that is, a BF-CSI-RS.

Antenna virtualization by an eNB is described below.

In the following equation, H denotes a channel matrix, F denotes a precoding matrix for a BF-CSI-RS, W denotes an assumed precoder, and V denotes an antenna virtualization matrix at an eNB.

In this case, an effective channel matrix for a UE including antenna virtualization is represented by Equation 4 below.

$$H_{\mathit{eff}} = HFVW = H[f_0 f_1]VW \qquad \text{[Equation 4]}$$

Here, the eNB may use W as one precoding matrix among codebooks in the conventional standard and may use matrix V for corresponding antenna virtualization as a unitary matrix of the codebook. In this case, assuming two antenna ports, the effective channel matrix may be represented by Equation 5.

$$H_{eff} = HFVW \quad \text{[Equation 5]}$$
$$= H[\ f_0 \quad f_1\ ]VW$$
$$= \begin{cases} Hf_0, & L=1 \\ [\ Hf_0 \quad Hf_1\ ], & L=2 \end{cases}$$

Here, W may be a precoding matrix determined by any of the aforementioned embodiments, or may be a precoding matrix fed back from the UE among the codebooks in the conventional standard. Here, the eNB may limit the operation of the UE to use only one codeword (that is, precoding matrix) for each rank using the codebook subset restriction function, in which case matrix V may be a unitary matrix of the limited precoding matrix.

Figure 15:
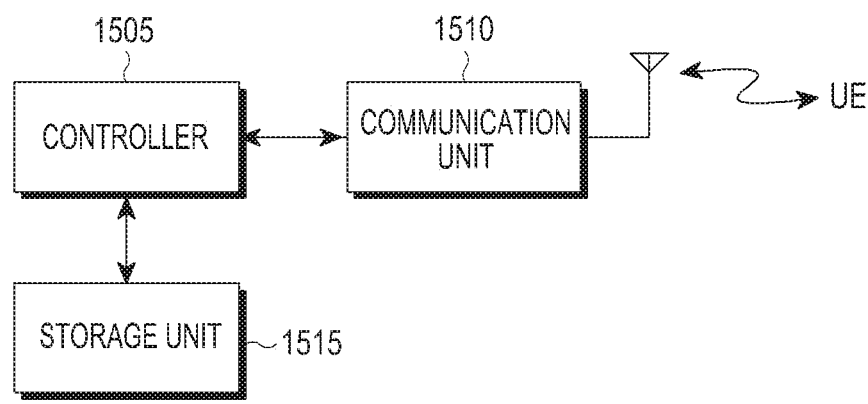
FIG. 15 illustrates the internal configuration of an eNB operating a beamformed reference signal in a communication system according to an embodiment of the present disclosure.

FIG. 15 illustrates the internal configuration of an eNB operating a beamformed reference signal in a communication system according to an embodiment of the present disclosure.

Referring to FIG. 15, the eNB includes a controller 1505, a communication unit 1510, and a storage unit 1515. The controller 1505 performs the aforementioned functions of beamforming information generation, RI/CQI/PMI adjustment, beamforming information application, and the like. In particular, the controller 1505 performs the overall operation according to at least one of the embodiments of the present disclosure. That is, the controller 1505 generates UE-specific beamforming information, compensates for an RI and a CQI based on CSI received from a UE, performs precoding adjustment, and applies beamforming to a CSI-RS and/or data to be transmitted to the UE.

The communication unit 1510 includes a transceiver that transmits or receives signaling, signals, and messages according to at least one of the embodiments of the present disclosure under the control of the controller 1505. The storage unit 1515 stores various pieces of data, information, and parameters generated from the controller 1505 and the communication unit 1510.

Figure 16:
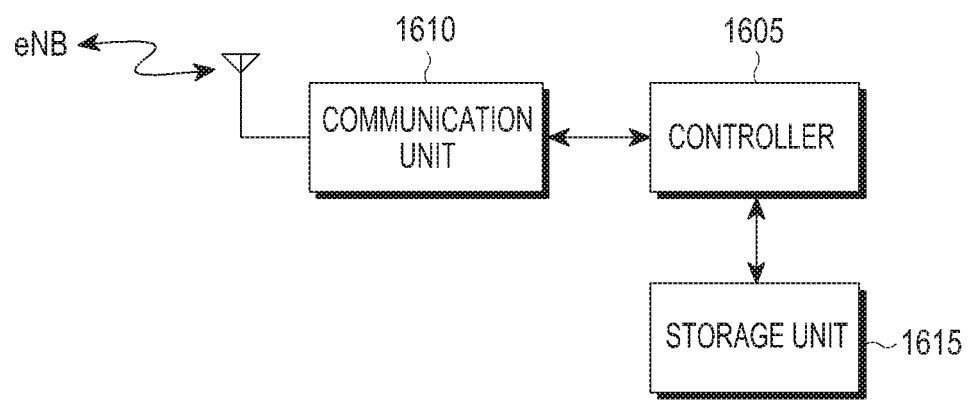
FIG. 16 illustrates the internal configuration of a UE performing non-codebook-based CSI reporting in a communication system according to an embodiment of the present disclosure.

FIG. 16 illustrates the internal configuration of a UE performing non-codebook-based CSI reporting in a communication system according to an embodiment of the present disclosure.

Referring to FIG. 16, the UE includes a controller 1605, a communication unit 1610, and a storage unit 1615. The controller 1605 performs the aforementioned functions of reference signal detection, feedback information generation, and the like. In particular, the controller 1605 performs CSI reporting according to at least one of the embodiments of the present disclosure. That is, the controller 1605 detects a reference signal received from an eNB and generates feedback information on the reference signal.

The communication unit 1610 includes a transceiver that transmits or receives signaling, signals, and messages according to at least one of the embodiments of the present disclosure under the control of the controller 1605. The storage unit 1615 stores various pieces of data, information, and parameters generated from the controller 1605 and the communication unit 1610.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be appreciated that the method according to various embodiments of the present disclosure may be implemented by a computer or portable terminal including a controller and a memory, wherein the memory is one example of machine-readable storage media suitable to store a program or programs including instructions for implementing the embodiments of the present disclosure.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus according to various embodiments of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

The embodiments of the present disclosure disclosed herein and shown in the drawings are merely specific examples presented in order to easily describe technical details of the present disclosure and to help the understanding of the present disclosure, and are not intended to limit the scope of the present disclosure. Further, the embodiments of the present disclosure as described above are merely illustrative, and it will be understood by those skilled in the art that various modifications and equivalents thereof are possible within the scope of the present disclosure. Therefore, the true technical scope of protection of the present disclosure should be defined by the following appended claims.

The invention claimed is:

1. A method for receiving channel state information, the method comprising:
   transmitting, to a user equipment (UE), a signaling message comprising information indicating whether the UE is configured without a precoding matrix indicator (PMI) reporting or not;
   transmitting, to the UE, a channel status information-reference signal (CSI-RS) for the UE; and
   receiving channel state information comprising a channel quality indicator (CQI) that is calculated based on a codebook which is provided to the UE through a higher-layer signaling, if the information indicates that the UE is configured without the PMI reporting,
   wherein the codebook is based on a number of layers and a number of ports used for CSI reporting.

2. The method of claim 1, wherein the channel state information comprises a rank indicator and the CQI without a precoding matrix indicator.

3. The method of claim 1, wherein the CSI-RS is beamformed based on an uplink signal received from the UE.

4. The method of claim 1, wherein the CQI included in the channel state information is calculated based on a precoding matrix selected for each rank by a codebook subset restriction function and a unitary matrix of the selected precoding matrix.

5. A method for transmitting channel state information, the method comprising:
   receiving, from an evolved node B (eNB), a signaling message comprising information indicating whether a user equipment (UE) is configured without a precoding matrix indicator (PMI) reporting or not;
   receiving, from the eNB, a channel status information-reference signal (CSI-RS) for the UE; and
   transmitting, to the eNB, channel state information comprising a channel quality indicator (CQI) that is calculated based on a codebook which is provided to the UE through a higher-layer signaling, if the information indicates that the UE is configured without the PMI reporting,
   wherein the codebook is based on a number of layers and a number of ports used for CSI reporting.

6. The method of claim 5, wherein the channel state information comprises a rank indicator and the CQI without a precoding matrix indicator.

7. The method of claim 5, wherein the CSI-RS is beamformed based on an uplink signal received from the UE.

8. The method of claim 5, wherein the CQI included in the channel state information is calculated based on a precoding matrix selected for each rank by a codebook subset restriction function of the eNB and a unitary matrix of the selected precoding matrix.

9. An apparatus in an evolved node B (eNB) for receiving channel state information, the apparatus comprising:
   a controller configured to:
      transmit, to a user equipment (UE), a signaling message comprising information indicating whether the UE is configured without a precoding matrix indicator (PMI) reporting or not,
      transmit, to the UE, a channel status information-reference signal (CSI-RS) for the UE, and
      receive channel state information comprising a channel quality indicator (CQI) that is calculated based on a codebook which is provided to the UE through a higher-layer signaling, if the information indicates that the UE is configured without the PMI reporting, wherein the codebook is based on a number of layers and a number of ports used for CSI reporting; and
   a transceiver configured to receive, from the UE, the channel state information under control of the controller.

10. The apparatus of claim 9, wherein the channel state information comprises a rank indicator and the CQI without a precoding matrix indicator.

11. The apparatus of claim 9, wherein the CSI-RS is beamformed based on an uplink signal received from the UE.

12. The apparatus of claim 9, wherein the CQI included in the channel state information is calculated based on a precoding matrix selected for each rank by a codebook subset restriction function and a unitary matrix of the selected precoding matrix.

13. An apparatus in a user equipment (UE) for transmitting channel state information, the apparatus comprising:
   a controller configured to:
      receive, from an evolved node B (eNB), a signaling message comprising information indicating whether the UE is configured without a precoding matrix indicator (PMI) reporting or not,
      receive, from the eNB, a channel status information-reference signal (CSI-RS) for the UE, and
      transmit, to the eNB, channel state information comprising a channel quality indicator (CQI) that is calculated based on a codebook which is provided to the UE through a higher-layer signaling, if the information indicates that the UE is configured without the PMI reporting, wherein the codebook is based on a number of layers and a number of ports used for CSI reporting; and
   a transceiver configured to:
      transmit, to the eNB, the channel state information under control of the controller.

* * * * *